United States Patent
Romano et al.

(10) Patent No.: US 10,795,880 B2
(45) Date of Patent: *Oct. 6, 2020

(54) SYSTEM AND METHOD FOR INTER-PROGRAM FILE CONTROL COMMUNICATION

(71) Applicant: Bank of America Corporation, Charlotte, NC (US)

(72) Inventors: Brad E. Romano, Furlong, PA (US); Shashi Thanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,755

(22) Filed: Oct. 28, 2019

(65) Prior Publication Data
US 2020/0089845 A1     Mar. 19, 2020

Related U.S. Application Data

(63) Continuation of application No. 15/277,418, filed on Sep. 27, 2016, now Pat. No. 10,459,911.

(51) Int. Cl.
| | |
|---|---|
| *G06F 16/20* | (2019.01) |
| *G06F 16/23* | (2019.01) |
| *G06F 16/13* | (2019.01) |
| *G06F 9/54* | (2006.01) |
| *G06F 11/00* | (2006.01) |
| *G06F 21/10* | (2013.01) |

(52) U.S. Cl.
CPC ............ *G06F 16/2365* (2019.01); *G06F 9/54* (2013.01); *G06F 11/00* (2013.01); *G06F 16/13* (2019.01); *G06F 21/105* (2013.01); *G06F 2221/0766* (2013.01); *G06F 2221/2137* (2013.01)

(58) Field of Classification Search
None
See application file for complete search history.

(56) References Cited

U.S. PATENT DOCUMENTS

| | | |
|---|---|---|
| 5,446,896 A | 8/1995 | Hegarty et al. |
| 5,630,074 A | 5/1997 | Beltran |
| 6,604,134 B2 | 8/2003 | Haury |
| 7,062,780 B2 | 6/2006 | Leerssen et al. |
| 7,434,233 B2 | 10/2008 | Kotani |

(Continued)

*Primary Examiner* — Jau Shya Meng
(74) *Attorney, Agent, or Firm* — Michael A. Springs

(57) ABSTRACT

A system for communication between two or more computer programs is disclosed. The system includes a memory, an interface, and a processor. The memory stores a first file, expected metadata for the first file, and expected metadata for one or more fields in the first file. The interface receives a file from a computer program. The file comprises fields that each comprise information provided by one or more sources. The processor executes a second computer program which extracts a first set of file metadata from the received file, compares the extracted first set of file metadata to the expected metadata, and determines if the extracted first set of file metadata corresponds to the expected metadata. If the extracted first set of file metadata corresponds to the expected metadata for the first file, then the processor performs analogous comparisons at a field level and stores the first file in the memory.

12 Claims, 3 Drawing Sheets

(56) References Cited

U.S. PATENT DOCUMENTS

| | | | |
|---|---|---|---|
| 7,865,934 | B2 | 1/2011 | Wobber et al. |
| 8,108,519 | B2 | 1/2012 | Zhang et al. |
| 2008/0073423 | A1 | 3/2008 | Heit et al. |
| 2008/0295112 | A1 | 11/2008 | Muscarella |
| 2010/0180349 | A1* | 7/2010 | Koohgoli ............ G06F 16/2358 726/30 |
| 2013/0347118 | A1* | 12/2013 | Yi ........................... G06F 21/10 726/26 |
| 2016/0012445 | A1 | 1/2016 | Villa-Real |
| 2018/0089185 | A1 | 3/2018 | Ramano et al. |
| 2018/0089293 | A1 | 3/2018 | Ramano et al. |
| 2018/0089579 | A1 | 3/2018 | Romano et al. |

* cited by examiner

SYSTEM AND METHOD FOR INTER-PROGRAM FILE CONTROL COMMUNICATION

CROSS-REFERENCE TO RELATED APPLICATIONS

This application is a continuation of U.S. patent application Ser. No. 15/277,418 filed Sep. 27, 2016, by Brad E. Romano et al., and entitled "SYSTEM AND METHOD FOR INTER-PROGRAM FILE CONTROL COMMUNICATION," which is incorporated herein by reference.

TECHNICAL FIELD OF THE INVENTION

The present invention generally relates to communication between two or more computer programs and specifically relates to systems and methods for inter-program file control communications.

BACKGROUND OF THE INVENTION

As computer systems and networks have become more complex, communication between programs within these systems increasingly present several technical challenges. Systems and methods for inter-program communication of files, for example, have proved inadequate in various respects. Accordingly, there is a need for robust inter-program file control systems and methods.

SUMMARY OF THE INVENTION

A system for communication between two or more computer programs comprising a memory, an interface, and a processor is disclosed. The memory stores a first file, expected metadata for the first file, and expected metadata for one or more fields in the first file. The interface receives one or more files from a computer program. The files comprise fields that each comprise information provided by one or more sources. The processor executes a second computer program. The second computer program is operable to extract a first set of file metadata from a received file, compare the extracted first set of file metadata to the expected metadata for the first file, and determine if the extracted first set of file metadata corresponds to the expected metadata for the first file. If the extracted first set of file metadata does not correspond to the expected metadata for the first file, the processor communicates an error to a user instructing the user to provide the expected metadata for the first file. However, if the extracted first set of file metadata does correspond to the expected metadata for the first file, then the processor extracts a first set of field metadata from a first set of fields in the first received file, compares the extracted first set of field metadata to the expected metadata for the first set of fields, and determines if the extracted first set of field metadata corresponds to the expected metadata for the first set of fields. If the extracted first set of field metadata does not correspond to the expected metadata for the first set of fields, the processor communicates a second error to the user instructing the user to provide the expected metadata for the first set of fields. And if the extracted first set of field metadata does correspond to the expected metadata for the first set of fields, the processor stores the first file in the memory.

The present embodiment presents several technical advantages. For example, in the present embodiment, two or more programs are able to communicate with each other by transferring files that are automatically subject to file controls. This ensures that the transferred files contain the right metadata. Further, in the present embodiment, one central computer program confirms whether files provisioned by several different provisioning programs comprise the right metadata instead of each separate program implementing inconsistent file controls. These embodiments further improve the functioning of the computer systems themselves. For example, by utilizing one central computer program to implement the automated file controls, processors run fewer repetitive instances that perform file controls at different programs. This conserves processing power that can be directed toward other tasks. Embodiments of the present disclosure also improve memory functionality by obviating the need for storing file controls in multiple repositories thereby allowing those repositories to perform other computing tasks.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
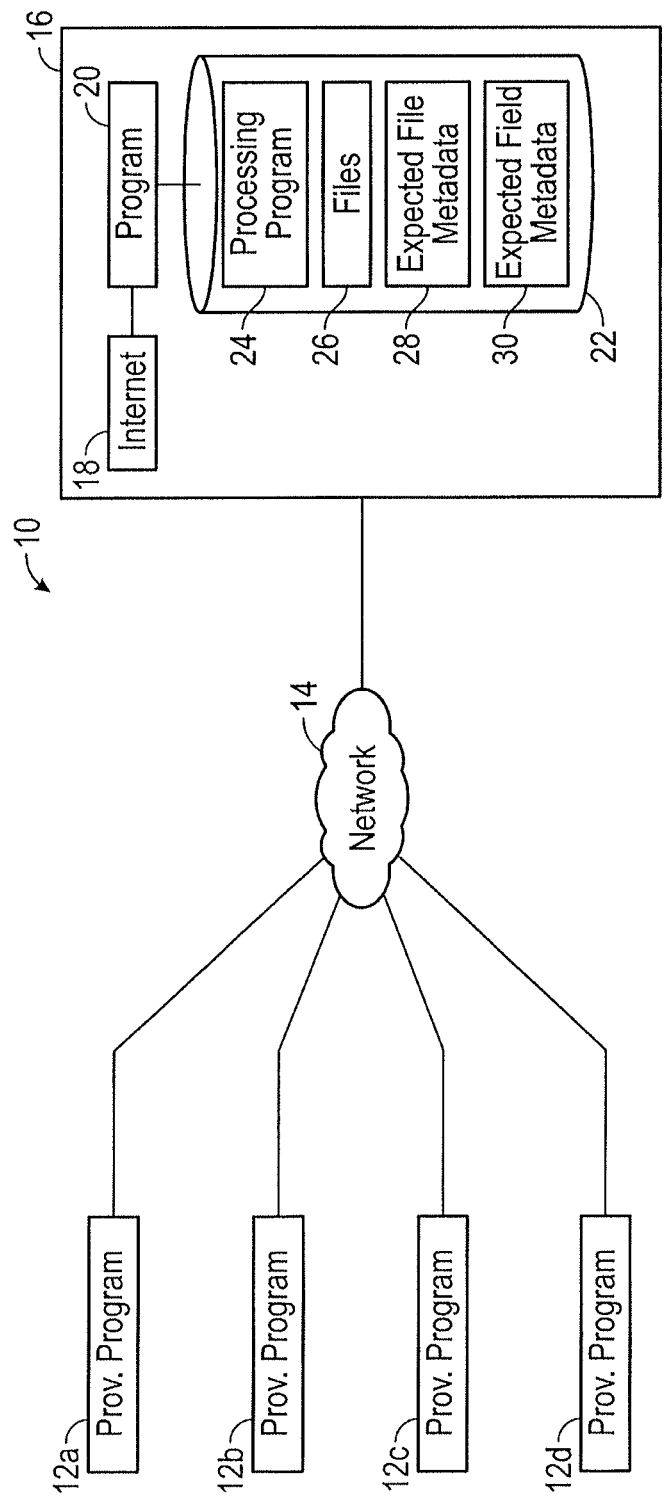
FIG. 1 illustrates one embodiment of an overall system for file control for inter-program communication.
Figure 2:
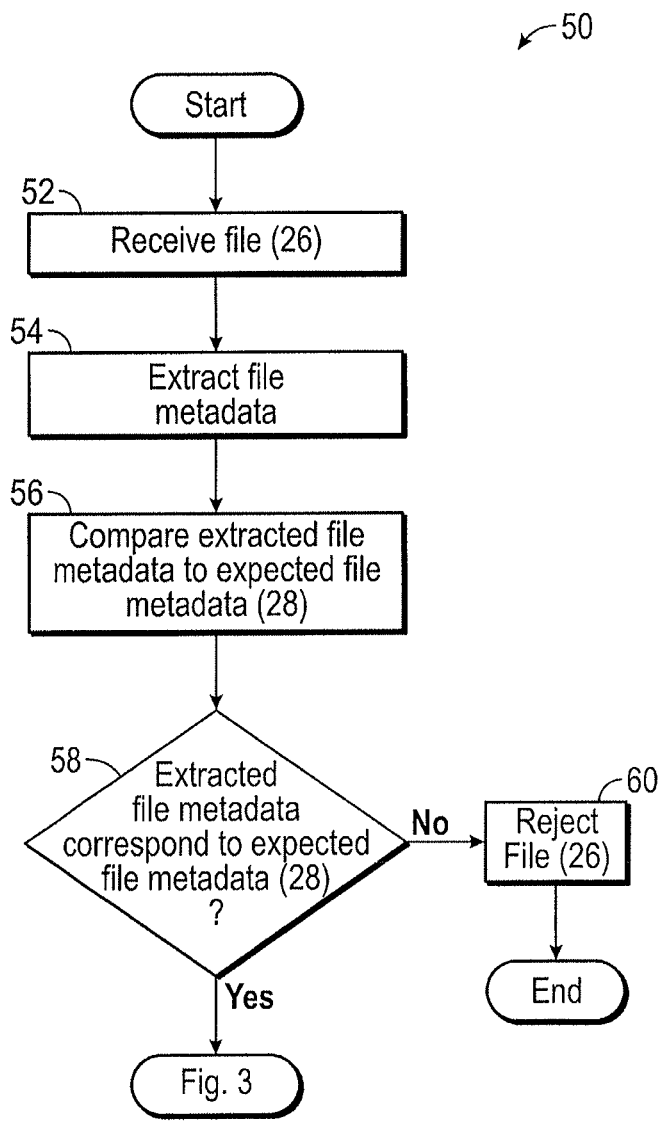
FIG. 2 illustrates an embodiment of a process for implementing file controls at a file level.
Figure 3:
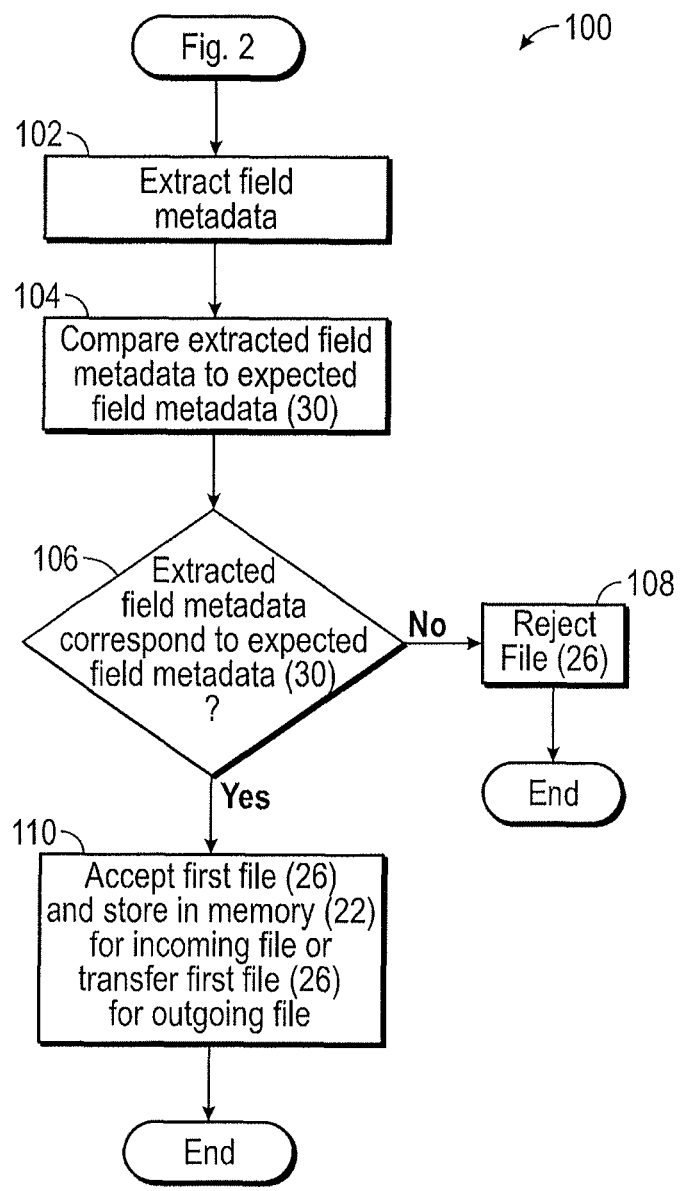
FIG. 3 illustrates an embodiment of a process for implementing file controls at a field level.

Embodiments of the present disclosure are best understood by referring to FIGS. 1 through 3 of the drawings, like numerals being used for like and corresponding parts of the various drawings.

Computer systems and networks are used in industries and home environments. Increasingly, industries relying on these computer systems and networks are beginning to push up against the technical limitations of such systems. One technical challenge faced by these computer systems is ensuring quality of data while communicating between running processes. For example, in some systems, one program may be designed to use and provision information and a second program may be designed to process and store that information. In such systems, where the programs are continuously running and provisioning and storing files, ensuring that the right metadata is associated with the transmitted and stored files presents several technical challenges.

One technical solution for overcoming such challenges is to rely on each individual provisioning program to implement rules for ensuring the quality of information that is being provisioned by that program. For example, in a computer system used for software development, one program may be responsible for provisioning source code and a second program may process that code for storage at a central repository. In such a system, the provisioning program may be required to provide certain metadata, such as the date the source code was generated, before the source code may be processed and stored by the second program. A problem with such a system, however, is that with multiple different provisioning programs, it may be inefficient and even unworkable to implement specific rules for each program. For example, one program may provision source code, another may provision revenue information, and a third may provision employee information. Creating individualized rules for each of these different programs results in a disparate application of the rules with inconsistent results. Some information that should be rejected for being incomplete is accepted and other information that should be accepted is rejected.

To address this technical problem, the present disclosure discloses a centralized file control system that streamlines inter-program communication. In one embodiment of the disclosed centralized file control system, a file processing engine receives files from many different provisioning programs. The processing engine then compares the received files to schemas that are stored in the processing engine. The schemas include information on the different metadata that is needed before certain types of files may be stored by the processing engine. For example, the schemas may stipulate that files related to revenue must be in currency format and files related to source code must include licensing information. If the received files are not correctly formatted or contain the right metadata, the files are rejected by the processing engine.

Moreover, the processing engine can also add a level of granularity to the incoming files by comparing, at a field level, whether the file contains the right metadata. So, for example, for an incoming file that contains source code, the processing engine may require the incoming file to contain the source code along with the source for the source code (e.g., whether it was generated by a third party, by an employee, etc.). The processing engine may require the source information to be in a particular format, e.g., as a URL or other resource locator identifying the source location. The processing engine may then identify which specific field failed to satisfy the schema and reject those specific fields.

This filtering scheme for incoming files results in several improvements to computer networks and computer technology. The embodiments of the present disclosure allow for individualized filtering of received files at a central processing engine. This improves filtering technology because it allows for the implementation of a centralized filtering system instead of inconsistent disparate filters implemented at individual data sources. Further, the disclosure improves computer technology by allowing computers to access the relevant data from a central database after the data has been aggregated, culled for completeness, and transformed into a standard format. Without this technical solution, the computer would need to collect data from several disparate sources. That would require the accessing computer to query multiple different data sources, download data from each of those sources, convert the data into a usable format, and filter and sort the data for incomplete and duplicative data before the accessing computer is able to use the data. This would consume considerable processing resources of the accessing computer. It would also lead to errors that would need to be resolved by the accessing computer. The present embodiment circumvents all these limitations of standard computers by transforming the accessed data and centralizing it in one repository that can be accessed by the accessing computer. In this manner, the functionality of the accessing computer is improved because that computer no longer needs to expend processing resources and bandwidth to access multiple databases and resolve errors. The present disclosure will be described in more detail using FIGS. 1 through 3. FIG. 1 illustrates an overall system for file control for inter-program communication. FIG. 2 illustrates a process for implementing file controls at a file level. And FIG. 3 illustrates a process for implementing file controls at a field level. Although the figures illustrate specific processes using specific steps in specific orders, other embodiments may comprise other similar processes comprising the same or other similar steps in the same or other order without departing from the spirit of the disclosure.

FIG. 1 illustrates a system 10 comprising provisioning programs 12a, 12b, 12c, and 12d. The provisioning programs 12 are coupled to a network 14 and a processing engine 16. Engine 16 further comprises an interface 18, a processor 20, and a memory 22. Memory 22 stores processing program 24, received files 26, expected file metadata 28, and expected field metadata 30.

Provisioning programs 12a, 12b, 12c, and 12d are programs or processes that generate or provision data to processing engine 16. Provisioning programs 12a, 12b, 12c, and 12d may be sources of data internal to an enterprise, external third party sources or a combination of the two. For example, provisioning program 12a may provision data from a department within a company whereas provisioning program 12b may provision data collected over the Internet. Provisioning programs 12a, 12b, 12c, and 12d may provision any suitable type of data. For example, provisioning programs 12a, 12b, 12c, and 12d may provision text data, code, data regarding time or date, numbers or any other suitable type of data. Provisioning programs 12a, 12b, 12c, and 12d may further provision metadata associated with the primary data. For example, provisioning programs 12a, 12b, 12c, and 12d may include information about the size of the primary data being provisioned along with the time and date that the primary data was last updated. Provisioning programs 12a, 12b, 12c, and 12d may further format the provisioned data in any appropriate manner. For example, provisioning programs 12a, 12b, 12c, and 12d may provide date data in mm/dd/yyyy format or mmddyy format.

Network 14 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 14 may additionally include any combination of gateways, routers, hubs, switches, access points, base stations, wireless telephone systems and any other hardware, software or a combination thereof. Network 14 may include any interconnecting system capable of transmitting audio, video, signals, data, messages, or any combination of the preceding between provisioning programs 12a, 12b, 12c, and 12d and processing engine 16.

In the illustrated embodiment, processing engine 16 is any module that comprises an interface 18, a processor 20 and a memory 22. Engine 16 may communicate with other aspects of system 10 via network 14. Engine 16 is operable to receive data provisioned by provisioning programs 12a, 12b, 12c, and 12d, process that information, and accept or reject the processed information based on the expected file metadata 28 and the expected field metadata 30.

Interface 18 represents any port or connection, real or virtual, including any suitable hardware and/or software, including protocol conversion and data processing capabilities, to communicate through a LAN, WAN, or other communication system that allows controller 16 to exchange information with the other components of system 10. Interface 18 may communicate with processor 20 and memory 22.

Processor 20 may be any electronic circuitry, including, but not limited to microprocessors, application specific integrated circuits (ASIC), application specific instruction set processor (ASIP), and/or state machines, that communicatively couples interface 18 and memory 22 and controls the operation of controller 16. In some embodiments, processor 20 may be single core or multi-core having a single chip containing two or more processing devices. Processor 20 may be 8-bit, 16-bit, 32-bit, 64-bit or of any other suitable architecture. Processor 20 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 20 may include other hardware and software that operates to control and process information. Processor 20 may execute computer-executable program instructions stored in memory 22. Processor 20 is not limited to a single processing device and may encompass multiple processing devices.

Memory 22 may include any one or a combination of volatile or non-volatile local or remote devices suitable for storing information. For example, memory 22 may include RAM, ROM, flash memory, magnetic storage devices, optical storage devices, network storage devices, cloud storage devices, solid state devices, or any other suitable information storage device or a combination of these devices. Memory 22 stores, either permanently or temporarily, data, operational software, other information for processor 20, other components of controller 16, or other components of system 10. For example, memory 22 may store user preferences or default settings for operating controller 16. Memory 22 may store information in one or more databases, file systems, tree structures, relational databases, any other suitable storage system, or any combination thereof. Furthermore, different information stored in memory 22 may use any of these storage systems. The information stored in memory 22 may be encrypted or unencrypted, compressed or uncompressed, and static or editable. Memory 22 may store information in one or more caches.

In one embodiment, memory 22 may store processing program 24, received files 26, expected file metadata 28, and expected field metadata 30.

Processing program 24 may be any computer program that is executed by processor 20 to process files 26 received by provisioning programs 12. Processing program 24 implements file controls by comparing metadata extracted from received files 26 to expected file metadata 28 and expected field metadata 30. After implementing the file controls, processing program 24 determines whether to store the received file 26 in memory 22 or reject received file 26. One embodiment of a process employed by processing program 24 to implement file controls is illustrated in FIG. 2 and explained in greater detail below.

Received files 26 may be any files 26 that comprise information and are provisioned by provisioning programs 12 and received by processing engine 16. Received files 26 may comprise primary data and metadata. Primary data may be any suitable information including information such as source code, revenue information, employee information etc. Metadata may be information about the primary data. For example, the metadata may include the size of received file 26, the time and/or date file 26 was last updated, the time and/or date file 26 was transmitted by provisioning program 12 and/or received by processing engine 16, the lineage of received file 26 including end-to-end dataflow information of the intermediary repositories and programs that used and/or provisioned file 26 and any other suitable data. In some embodiments, files 26 may comprise one or more headers and metadata for files 26 may be included in the header. For example, a file 26 header may include information such as the source of file 26, the destination for file 26, the author of file 26 etc.

Expected file metadata 28 is data that processing program 24 uses to create a schema for determining if received file 26 comprises the right metadata for processing program 24 to store received file 26. For example, processing program 24 may expect to receive file metadata 28 including the size of received file 26, the time and/or date file 26 was last updated, the time and/or date file 26 was transmitted by provisioning program 12 and/or received by processing engine 16, the lineage of received file 26 including end-to-end dataflow information of the intermediary repositories and programs that used and/or provisioned file 26, and/or any other suitable data. Expected file metadata 28 may be different for different types of received files 26. For example, expected file metadata 28 for numerical data may include formatting requirements such as currency or date format whereas expected file metadata 28 for textual data may include author information among others.

Expected field metadata 30 is similar to expected file metadata 28 except it relates to specific fields within a file 26. Thus, expected field metadata 30 comprises data that processing program 24 expects to receive from fields within received file 26 when received file 26 is transmitted by provisioning program 12. For example, processing program 24 may expect to receive field metadata 30 including the range of specific fields within received file 26, the time and/or date particular fields within file 26 were last updated, the time and/or date fields within file 26 were transmitted by provisioning program 12 and/or received by processing engine 16, the lineage of specific fields within received file 26 including the intermediary repositories and programs that used and/or provisioned file 26, and/or any other suitable data.

In operation, provisioning programs 12 transmit one or more files 26 to processing engine 16 via network 14. For example, provisioning program 12 may transmit a file 26 comprising uncompiled source code to processing engine 16. Processing engine 16 can process files 26 as described below for both incoming files 26 as well as outgoing files 26. Processing engine 16 then executes processing program 24 using processor 20. When processing engine 16 receives a file 26 from provisioning program 12, processing program 24 extracts file metadata 28 from the received file 26 and compares it with expected file metadata 28 that is stored in memory 24. So, for example, processing program 24 may extract licensing information about the source code from file 26 and compare it with a list of approved licenses stored in memory 24. If the received file 26 has the expected file metadata 28, processing program 24 then extracts field metadata from the received file 26 and compares that against expected field metadata 30. So, for example, processing program 24 may compare the expiration date of the license in the source code against a list of allowed expiration dates for licenses stored in memory 24. If received file 26 has both the expected file metadata 28 and expected field metadata 30, processing program 24 processes the received file 26 and stores the received file 26 in memory 22. So, in the source code example, if the type of license and the expiration date of the license are both allowed, processing program 24 may store the received file 26 comprising the source code in memory 22. If received file 26 does not have both the expected file metadata 28 and expected field metadata 30, processing program 24 may filter out some or all of received file 26.

This individualized filtering of received files 26 at a central location based on pre-defined rules improves filtering technology as well as computer technology generally. By filtering out incomplete received files 26, processing program 24 reduces potential future errors that other computer systems may encounter if they tried to access and use incomplete received files 26. General computer systems are inherently limited in that they can only access and manipulate data that is complete and in the right format. The present system 10 improves computer functionality because it overcomes this inherent limitation of computer systems. By using system 10, a computer system that needs to access received files 26 no longer needs to expend processing resources to resolve the errors that the system would encounter if processing engine 16 did not implement processing program 24. Instead, the computer system may access the relevant received files 26 in a standard format from one central location without needing to correct for any inaccuracies or gaps in the data and metadata of received files 26. As discussed in greater detail below, FIGS. 2 and 3 illustrate embodiments of how processing program 24 receives files 26 and processes them for storage in memory 22.

FIG. 2 illustrates a process 50 executed by processing program 24 to implement file controls at a file level. As illustrated in FIG. 2, in process 50, processing program 24 first receives file 26 at step 52. Next, at step 54, processing program 24 extracts file metadata 28 from received file 26. At step 56, processing program 24 compares the extracted metadata to expected file metadata 28. Then, at step 58, processing program 24 determines whether the extracted file metadata from file 26 corresponds to the expected field metadata 30. This may be done in several different ways. For example, at step 58 processing program 24 may extract a header from received file 26 to determine if received file 26 includes metadata showing the lineage of file 26. As such, processing program 24 may determine if, for example, received file 26 comprises metadata including a URL or other locator providing an address to the source of received file 26. Processing program 24 may also determine if received file 26 comprises other metadata such as information about the range of values within received file 26. Here processing program 24 may compare the range of values within received file 26 to a predetermined range that is stored as expected file metadata 28.

If processing program 24 determines that received file 26 does not comprise metadata corresponding to expected metadata 26, then at step 60, processing program 24 sends an error to processing program 24, filters all or part of file 26, or otherwise rejects received file 26. Processing program 24 may reject received file 26 in any appropriate manner, including by alerting a user of the missing metadata, by rejecting received file 26 completely, or by accepting a portion of received file 26 for storage in memory 22. If, at step 58, processing program 24 determines that the extracted metadata from file 26 corresponds to the expected metadata 28 then process 50 moves on to process 100 illustrated in FIG. 3.

FIG. 3 illustrates a process 100, executed by processing program 24, to implement field controls at the field level. As illustrated in FIG. 3, in process 100, processing program 24 first extracts field metadata from received file 26 at step 102. Then, at step 104, processing program 24 compares the extracted field metadata to the expected field metadata 30. Processing program 26 may do this in any suitable manner. For example, processing program 24 may extract all numerical data stored in received file 26 and compare the range of the extracted numerical data against expected field metadata 30 to determine if the range of values in received file 26 corresponds to an expected range of values in expected field metadata 30. Then, at step 106, processing program 24 compares the extracted metadata to the expected field metadata 30. If, at step 106, processing program 24 determines that the extracted field metadata does not correspond to the expected field metadata 30, then, at step 108, processing program 24 issues an error, filters all or part of file 26, or otherwise rejects file 26. Processing program 24 may issue this rejection or error in any suitable manner including by alerting a user that received file 26 does not have the correct field metadata, by accepting some field metadata and rejecting other field metadata, or in any other suitable manner. If, at step 106, the extracted field metadata does correspond to the expected field metadata 30, then execution proceeds to step 110. If the files 26 are incoming files 26, then at step 110 processing program 24 accepts the received file 26 and stores the file 26 in memory 22. If the files 26 are outgoing files 26, then at step 110 processing program 24 transfers file 26, such as to any another component of system 10.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for communication between two or more computer programs comprising:
   a memory stores a first file, expected metadata for the first file, expected metadata for one or more fields in the first file, and a second computer program;
   an interface receives one or more files from a first computer program, wherein the files comprise one or more fields, wherein each of the one or more fields comprises information provided by one or more sources;
   a processor executing the second computer program to:
      extract a first set of file metadata from a received file, wherein:
         the file comprises source code; and
         the first set of metadata comprises licensing information for a license associated with the source code;
      compare the extracted first set of file metadata to the expected metadata for the first file, wherein comparing the extracted first set of file metadata to the expected metadata for the first file comprises comparing the licensing information to a list of approved licenses;

determine that the extracted first set of file metadata corresponds to the expected metadata for the first file, and, in response:
  extract a first set of field metadata from a first set of fields in the received file, wherein the first set of field metadata comprises an expiration date for the license associated with the source code;
  compare the extracted first set of field metadata to the expected metadata for the first set of fields, wherein comparing the extracted first set of field metadata to the expected metadata for the first set of fields comprises comparing the expiration date for the license to a predetermined time range;
  determine if the extracted first set of field metadata corresponds to the expected metadata for the first set of fields; and
  if the extracted first set of field metadata does not correspond to the expected metadata for the first set of fields, communicate an error to a user instructing the user to provide the expected metadata for the first set of fields; and
  if the extracted first set of field metadata does correspond to the expected metadata for the first set of fields, store the first file in the memory.

2. The system of claim 1, wherein the expected file metadata comprises file end-to-end dataflow information for the first file.

3. The system of claim 1, wherein the expected field metadata comprises end-to-end dataflow information for the first set of fields.

4. The system of claim 1, wherein communicating the error further comprises providing a deadline for the user to provide the corresponding expected field metadata.

5. The system of claim 1, wherein the processor is further notifies the user of which metadata in the received first file does not correspond to the expected metadata for the first file.

6. The system of claim 1, wherein extracting the first set of file metadata from the first received file comprises extracting the first set of file metadata from a header of the first received file.

7. A method for communication between two or more computer programs comprising:
  receiving, by a processor, one or more files from a second program, wherein the files comprise one or more fields, wherein each of the one or more fields comprises information provided by one or more sources;
  extracting, by the processor, a first set of file metadata from a received file, wherein:
    the file comprises source code; and
    the first set of metadata comprises licensing information for a license associated with the source code;
  comparing, by the processor, the extracted first set of file metadata to stored expected metadata for a first file, wherein comparing the extracted first set of file metadata to the expected metadata for the first file comprises comparing the licensing information to a list of approved licenses;
  determining, by the processor, that the extracted first set of file metadata corresponds to the expected metadata for the first file, and, in response:
    extracting, by the processor, a first set of field metadata from a first set of fields in the first received file, wherein the first set of field metadata comprises an expiration date for the license associated with the source code;
    comparing, by the processor, the extracted first set of field metadata to stored expected metadata for the first set of fields, wherein comparing the extracted first set of field metadata to the expected metadata for the first set of fields comprises comparing the expiration date for the license to a predetermined time range;
    determining, by the processor, if the extracted first set of field metadata corresponds to the expected metadata for the first set of fields; and
    if the extracted first set of field metadata does not correspond to the expected metadata for the first set of fields, communicating, by the processor, an error to a user instructing the user to provide the expected metadata for the first set of fields; and
    if the extracted first set of field metadata does correspond to the expected metadata for the first set of fields, storing, by the processor, the first file in a memory.

8. The method of claim 7, wherein the expected file metadata comprises file end-to-end dataflow information for the first file.

9. The method of claim 7, wherein the expected field metadata comprises end-to-end dataflow information for the first set of fields.

10. The method of claim 7, wherein communicating the error further comprises providing a deadline for the user to provide the corresponding expected field metadata.

11. The method of claim 7, further comprising notifying, by the processor, the user which metadata in the received first file does not correspond to the expected metadata for the first file.

12. The method of claim 7, wherein extracting the first set of file metadata from the first received file comprises extracting the first set of file metadata from a header of the first received file.

* * * * *